(12) United States Patent
Zaremba et al.

(10) Patent No.: US 6,661,194 B2
(45) Date of Patent: Dec. 9, 2003

(54) REAL-TIME ESTIMATION OF INDUCTION MACHINE PARAMETERS USING SINUSOIDAL VOLTAGE SIGNALS

(75) Inventors: Alexander T Zaremba, Dearborn Heights, MI (US); Sergey G. Semenov, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/073,610

(22) Filed: Feb. 11, 2002

(65) Prior Publication Data

US 2003/0155885 A1 Aug. 21, 2003

(51) Int. Cl.[7] .................................................. H02P 5/28
(52) U.S. Cl. ........................ 318/727; 318/798; 318/807
(58) Field of Search ................................. 318/727, 807, 318/808, 809, 810, 729, 798, 805, 806

(56) References Cited

U.S. PATENT DOCUMENTS

| | | | |
|---|---|---|---|
| 4,023,083 A | 5/1977 | Plunkett | |
| 4,400,655 A | 8/1983 | Curtiss et al. | |
| 4,469,997 A | 9/1984 | Curtiss et al. | |
| 4,617,675 A | 10/1986 | Ashikaga et al. | |
| 4,636,702 A | 1/1987 | Hedges | |
| 5,153,489 A | 10/1992 | Unsworth et al. | |
| 5,471,127 A | 11/1995 | Vaughan et al. | |
| 5,488,280 A | 1/1996 | Langreck | |
| 5,498,945 A | 3/1996 | Prakash | |
| 5,796,235 A | 8/1998 | Schrodl et al. | |
| 5,796,236 A | 8/1998 | Royak | |
| 5,861,728 A | * 1/1999 | Tazawa et al. | 318/798 |
| 5,886,498 A | 3/1999 | Sul et al. | |
| 6,066,934 A | 5/2000 | Kaitani et al. | |
| 6,281,659 B1 | * 8/2001 | Giuseppe | 318/804 |
| 6,316,904 B1 | * 11/2001 | Semenov et al. | 318/805 |
| 6,433,506 B1 | * 8/2002 | Pavlov et al. | 318/804 |
| 6,459,230 B1 | * 10/2002 | Tao | 318/804 |

OTHER PUBLICATIONS

"Real–Time Estimation of the Electric Parameters of an Induction Machine Using Sinusoidal PWM Voltage Waveforms", Ribeiro et al, IEEE Transactions on Industry Applications, vol. 36, No. 3, May/Jun. 2000, pp. 743–754

* cited by examiner

Primary Examiner—Shih-Yung Hsieh
Assistant Examiner—Eduardo Colon-Santana
(74) Attorney, Agent, or Firm—Brooks & Kushman; Carlos L. Hanze

(57) ABSTRACT

A method and strategy for providing real-time estimates of the machine parameters of an induction machine, including rotor resistance, rotor inductance, stator resistance, stator inductance and mutual inductance. The induction machine is a part of a torque delivery driveline. The method comprises expressing stator voltage as a function of machine parameters, stator current, stator excitation frequency and slip frequency. A functional relationship of rotor current, rotor resistance, rotor flux, electrical speed of applied stator voltage and rotor electrical speed is defined. Rotor current and characteristic parameters are calculated, the machine parameters being calculated using the characteristic parameters.

7 Claims, 7 Drawing Sheets

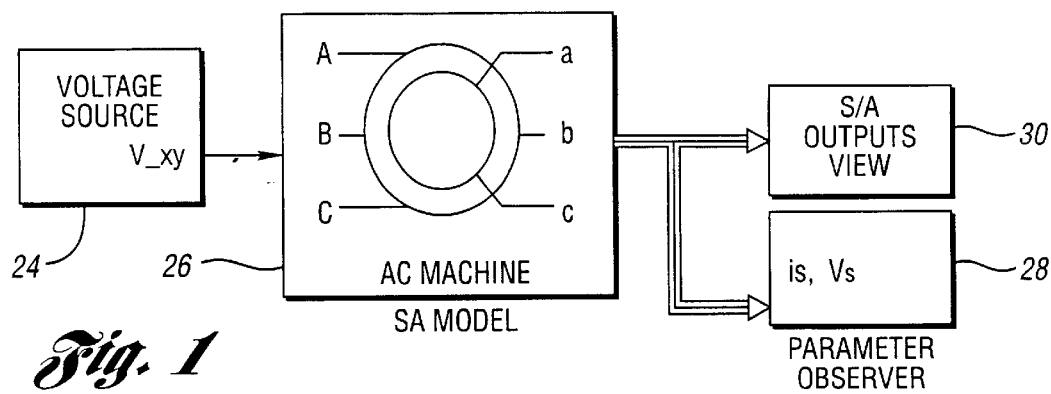
*Fig. 1*
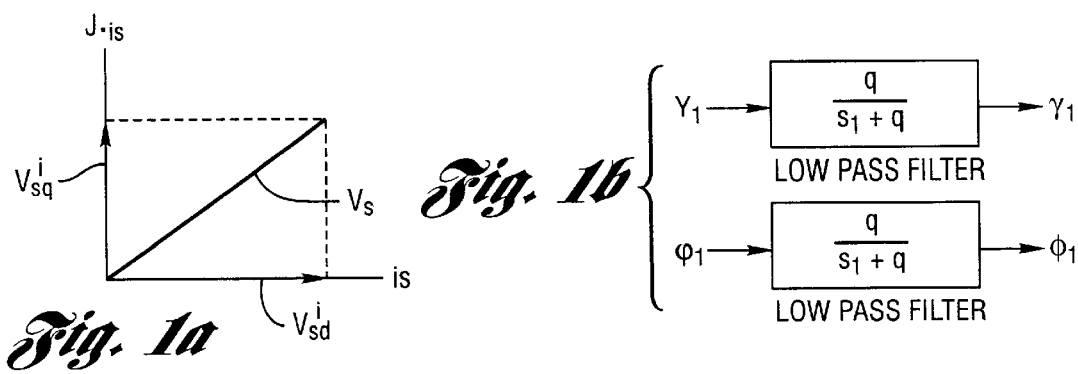
*Fig. 1a*
*Fig. 1b*
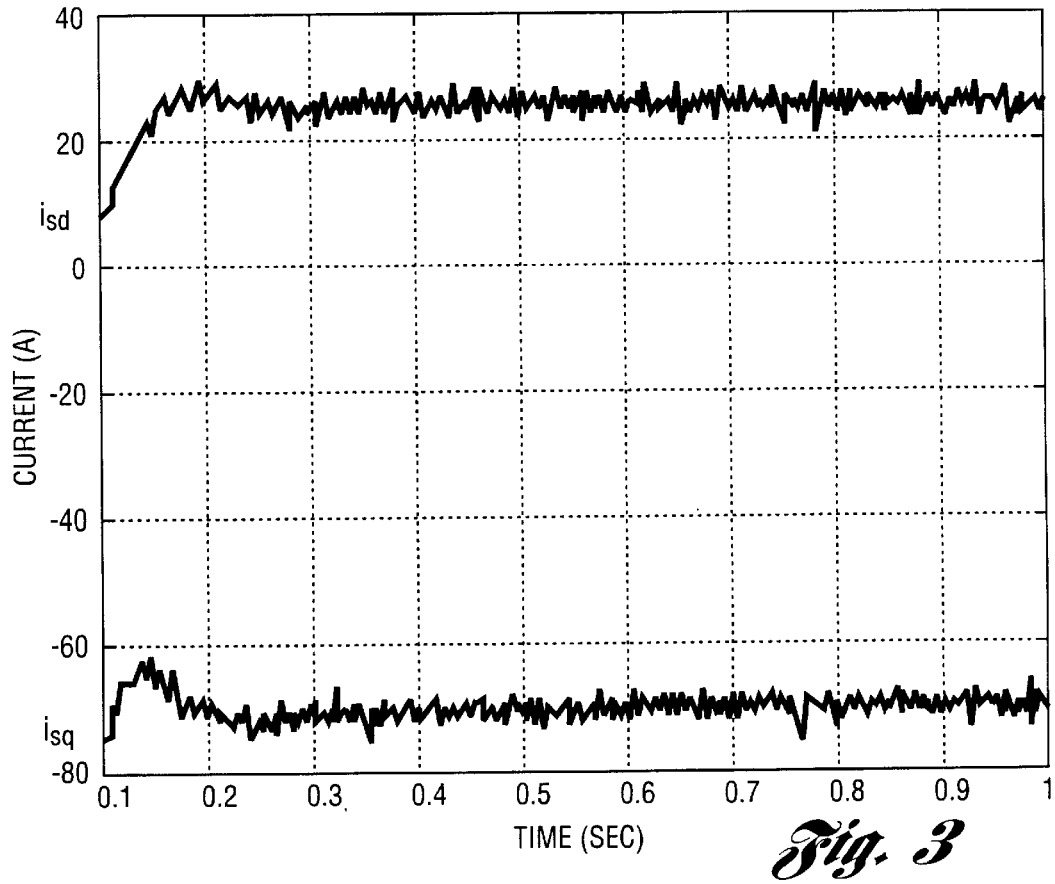
*Fig. 3*

REAL-TIME ESTIMATION OF INDUCTION MACHINE PARAMETERS USING SINUSOIDAL VOLTAGE SIGNALS

BACKGROUND OF THE INVENTION

1. Field of the Invention

The invention relates to a method for estimating in real-time the parameters of a multi-phase induction machine.

2. Background Art

The use of induction machines in industrial applications in recent years is becoming more common, especially in automotive applications. An induction machine is particularly suited for an automotive environment because of its rugged nature and low cost. Examples of such applications include electric vehicles, hybrid electric vehicles in which an induction machine is a part of a powertrain that includes an internal combustion engine, fuel cell electric vehicles, integrated starter generator systems, electric power-assisted steering, etc. Induction machines for such applications provide potential for increased fuel economy and reduced engine exhaust emissions. They also make it possible to meet the demands of increased vehicle electrical loads.

An electric machine, when used in an automotive application, must be capable of operating with variable torque control over a fairly wide speed range. Controllers for such induction machines must rely upon known machine parameters.

The machine parameters in the case of control systems that do not rely upon sensors for measuring rotor position, speed or flux are estimated. In this way, control of the behavior of the induction machine in the powertrain is achieved as the operating conditions of the powertrain change and as the machine variables change.

Aside from the need for torque control, there is a need for estimating machine parameters for purposes of failure detection, analysis and failure mitigation. This requires an on-line estimation technique.

SUMMARY OF THE INVENTION

It is assumed for purposes of this invention disclosure that the invention is used to estimate the basic machine parameters of a machine that is part of a microcomputer-controlled, alternating current, drive system. The method of the invention is based on an induction machine model in a synchronously rotating frame. It utilizes sinusoidal pulse width modulated voltage signals in an identification test for the machine parameters. The microcomputer for the system includes an algorithm that provides an accurate estimation of the stator and rotor parameters based on stator current measurement and voltage commands. Torque measurements and position measurements are not required.

The method of the invention uses a parameter identification technique that includes projection of the stator voltage signal on the axes related with the stator current in a synchronously rotating frame.

The method of the invention includes the step of expressing stator voltage as a function of stator current, stator resistance, stator flux and stator excitation frequency. A functional relationship is established between rotor current, rotor flux, rotor resistance, electrical speed of applied stator voltage and rotor electrical speed. That functional relationship is transformed to eliminate derivatives and flux variables when an induction machine operates in a steady state condition. The rotor current is computed as a function of measured stator current. The stator voltage is calculated as a function of machine parameters; stator current, electrical speed and slip frequency.

The stator voltage components determine characteristic parameters, which are used to compute induction motor parameters.

BRIEF DESCRIPTION OF THE DRAWINGS

FIG. 1 is a schematic diagram of an induction machine parameter identification model;

FIG. 1a is a vector diagram showing the projection of stator voltage on stator current orthogonal vectors; i.e., is and J·is;

FIG. 1b is a low pass filter diagram;

FIG. 3 is a graph showing the stator current in a synchronously rotating frame for a no-load test;

DETAILED DESCRIPTION OF THE PREFERRED EMBODIMENTS

Figure 2:
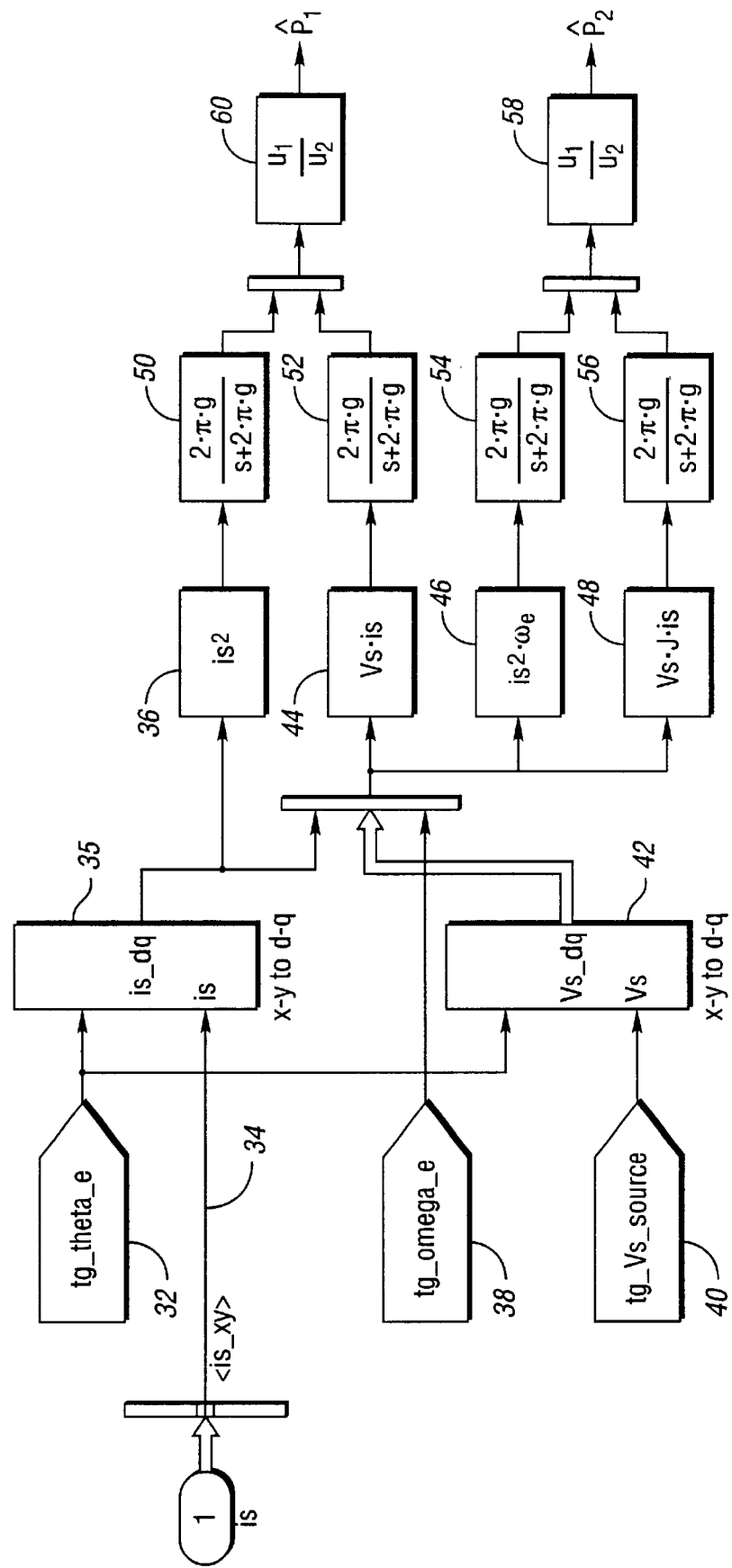
FIG. 2 is a diagram of the subsystems for the model indicated in FIG. 1, the subsystems representing the induction machine parameter observers.

For the purpose of describing the real-time estimation technique of the invention, a description first will be made of an identification model of an induction machine. This can be a standard dynamic model of an induction machine in a synchronously rotating frame.

An induction machine has five machine parameters. These are the rotor resistance, the rotor inductance, the stator resistance, the stator inductance, and the mutual inductance. Each of these parameters is used in sensorless torque control of an induction machine. Real-time monitoring of the induction machine parameters fulfills the need for accurate failure detection analysis and failure mitigation.

The induction machine model is a dynamic model of an induction machine in a synchronously rotating frame. It is identified by the following equations:

$$V_s = r_s i_s + \omega_e J \lambda_s + \frac{d\lambda_s}{dt} \quad (1)$$

$$0 = r_r i_r + (\omega_e - \omega_r) J \lambda_r + \frac{d\lambda_r}{dt} \quad (1a)$$

where J is a skew symmetric matrix $$J = \begin{pmatrix} 0 & -1 \\ 1 & 0 \end{pmatrix} \quad (2)$$

and $V_s$, $i_s$, $r_s$, $\lambda_s$, are the stator voltage, current, resistance, and flux; $i_r$, $r_r$, $\lambda_r$ are the rotor current, resistance, and flux; $\omega_e$, $\omega_r$ are the stator excitation frequency and rotor electric speed. All variables are assumed to be in the synchronously rotating frame and the corresponding index is omitted.

Using the expressions for the stator and rotor fluxes, $$\lambda_s = L_s i_s + L_M i_r$$

$$\lambda_r = L_r i_r + L_M i_s, \quad (3)$$

where $L_s$, $L_r$, $L_M$ are the stator, rotor and mutual inductances, and assuming that the induction machine is at steady-state, the equation (1) is transformed to:

$$V_s = r_s i_s + \omega_e J (L_s i_s + L_M i_r) \quad (4a)$$

$$0 = r_r i_r + \omega_s J (L_r i_r + L_M i_s), \quad (4b)$$

where is $\omega_s = \omega_e - \omega_r$ is the slip frequency and $\omega_e$ is the electrical speed. This value is the frequency of the voltage that is selected at the outset as a voltage command (i.e., the selected nominal or rated voltage frequency).

In the model (4a and 4b) the rotor current is a variable unavailable for the measurement, so equation (4b) is used to express the rotor current via the measured stator current; i.e., $$i_r = \frac{-r_r I + \omega_s L_r J}{r_r^2 + \omega_s^2 L_s^2} \omega_s L_M J i_s \quad (5)$$

where I is the identity 2-matrix:

$$I = \begin{pmatrix} 1 & 0 \\ 0 & 1 \end{pmatrix}.$$

It should be noted that equations (4a) and (4b) do not have derivatives. Neither do they have a flux term (flux, as is the case for rotor current, cannot be measured). When voltage $V_s$ is in a steady state and is sinusoidal, $\omega_e$ is defined.

The value of the rotor current(s) then is substituted for the rotor current value in equation (4a).

Substituting (5) into (4a) gives the model that relates only the measured or known variables and induction machine parameters; i.e., $$V_s = \left( r_s + r_r \frac{\omega_e \omega_s L_M^2}{r_r^2 + \omega_s^2 L_r^2} \right) i_s + \omega_e \left( L_s - L_r \frac{\omega_s^2 L_M^2}{r_r^2 + \omega_s^2 L_r^2} \right) J i_s. \quad (6)$$

It is thus seen that stator voltage can be computed because equation (6) is a function of the five machine parameters, described previously.

In equation (6), $i_s$ is a measured quantity. The five machine parameters in equation (6) are $r_s$, $r_r$, $L_r$, $L_M$ and $L_s$.

As seen in FIG. 1a, the first term in (6) is parallel to the stator current vector and the second term is orthogonal to it.

By introducing notation:

$$V_{sd}^i = \frac{V_s i_s}{|i_s|} \quad (7)$$

$$V_{sq}^i = \frac{V_s J i_s}{|i_s|},$$

and by projecting (6) on vectors $i_s$ and $J i_s$, as seen in FIG. 1a, the two equations for d–q components of the stator voltage are determined; i.e., $$V_{sd}^i = \left( r_s + r_r \frac{\omega_e \omega_s L_M^2}{r_r^2 + \omega_s^2 L_r^2} \right) |i_s| \quad (8a)$$

$$V_{sq}^i = \omega_e \left( L_s - L_r \frac{\omega_s^2 L_M^2}{r_r^2 + \omega_s^2 L_r^2} \right) |i_s|. \quad (8b)$$

Equations (8a) and (8b) are the base for the parameters estimation scheme outlined below.

The projection of the voltages on the current vectors $i_s$ and $J i_s$ is illustrated in FIG. 1a.

The parameter estimation algorithms now will be described.

Transform equation (8a) to the regression form:

$$Y_1(k) = P_1 \phi_1(k) \quad k=1, \ldots, n, \quad (9)$$

where $Y_1(k)$ and $\phi_1(k)$ are, respectively, the d-component of the stator voltage and the current amplitude measured at time $t_k$ $$Y_1(k) = V_{sd}^i(t_k) \quad (9a)$$

$$\phi_1(k) = |i_s(t_k)| \quad (9b)$$

and $P_1$ is the characteristic parameter to be estimated; i.e., $$P_1 = r_s + r_r \frac{\omega_e \omega_s L_M^2}{r_r^2 + \omega_s^2 L_r^2}. \quad (10)$$

In equations (9a), (9b), $Y_1$ is the calculated stator voltage is($t_k$)is the measured stator current, and $t_k$ is the time measurement instant.

To improve the estimator robustness with respect to the noise in the current measurement, the parameter estimation can be obtained as a solution of the continuous set of equations (9), (9a) and (9b) over a given time interval. The usual strategy is to put the maximum weight on the recent measurements and to gradually discount the previous measurements.

Minimizing the integral mean error, $$\int_0^t e^{-gs} |Y_1(t-s) - P_1 \varphi_1(t-s)|^2 \, ds \to \min, \quad (11)$$

with the discount factor $e^{-gs}$ leads to the following estimation scheme for the parameter $P_1$ $$\frac{d\gamma_1}{dt} + g\gamma_1 = gY_1 \quad (12a)$$

$$\frac{d\Phi_1}{dt} + g\Phi_1 = g\varphi_1 \quad (12b)$$

-continued $$\hat{P}_1 = \frac{\gamma_1}{\Phi_1}. \quad (12c)$$

In equation (11), $e^{-gs}$ is a discount factor. The term g defines the characteristic time interval over which measurements of current and voltage are selected. The term s is an integration variable. The current, as well as voltage, are measured over time.

In the foregoing equations 12(a), 12(b) and 12(c), the term g is the bandwidth of the low pass filter. A low pass filter diagram for the equations (12a) and (12b) is shown in FIG. 1*b* where $s_1$ is a Laplace transform variable.

In equation 12(c), the result of the estimation of parameter $P_1$ is represented as $\hat{P}_1$.

Similarly, equation (8b) is represented as:

$$Y_2(k) = P_2 \phi_2(k) \; k=1, \ldots, n, \quad (13)$$

where $$Y_2(k) = V_{sq}^i(t_k)$$

$$\varphi_2(k) = \omega_e(t_k)|i_s(t_k)| \quad (14)$$

$$P_2 = \left(L_s - L_r \frac{\omega_s^2 L_M^2}{r_r^2 + \omega_s^2 L_r^2}\right).$$

The observer for $P_2$ is determined as follows:

$$\frac{d\gamma_2}{dt} + g\gamma_2 = gY_2 \quad (15a)$$

$$\frac{d\Phi_2}{dt} + g\Phi_2 = g\varphi_2 \quad (15b)$$

$$\hat{P}_2 = \frac{\gamma_2}{\Phi_2}. \quad (15c)$$

The procedure used to obtain the value for $\hat{P}_2$ is the same as the procedure described above to get $\hat{P}_1$.

The five machine variables mentioned above are obtained using the values for $\hat{P}_1$ and $\hat{P}_2$.

The observers at (12a–12c) and at (15a–15c) are equivalent to the low pass filtering of the input and output signals of the regression models (9), (13).

Estimation of parameters $P_1$, $P_2$ at no load condition (the slip frequency equals to zero $\omega_s=0$) defines the value of the stator resistance and inductance $$r_s = \hat{P}_1 \big|_{\omega_2=0} \quad (16)$$

$$L_s = \hat{P}_2 \big|_{\omega_2=0}.$$

The second test is performed when the slip frequency is high. Selecting locked rotor condition to maximize the slip frequency and assuming that the slip frequency is much higher than the rotor time constant, we get $$\omega_s = \omega_e, \text{ where} \quad (17)$$

$$\omega_s \gg \frac{r_r}{L_r}. \quad (17)$$

This determines the estimation of the rotor resistance; i.e., $$r_r \cong \frac{L_r^2}{L_m^2}\left(\hat{P}_1\big|_{\omega_s=\omega_e} - \hat{P}_1\big|_{\omega_s=0}\right). \quad (18)$$

The second characteristic parameter provides the estimation of the sum of the rotor and stator self inductances $$L_{1s} + L_{1r} = \hat{P}_2\big|_{\omega_s\omega_e}. \quad (19)$$

Equalities (16), (18), (19) define the set of the induction machine parameters.

In equation (19), $L_{1s}$ is the stator leakage term and $L_{1r}$ is the rotor leakage term.

Stator inductance $L_s$ is equal to mutual inductance $L_M$ plus stator leakage. It is assumed that leakage $L_{1s}$ and leakage $L_{1r}$ are equal. Thus, mutual inductance $L_M$ can be computed.

Note that when the rotor speed is measured, the estimations (18), (19) can be performed at any value of the slip frequency by resolving nonlinear expressions (10) and (14). From (10), it follows that the second addendum in (10) has maximum value for fixed excitation frequency when the slip frequency equals:

$$\omega_s^{max} = \frac{r_r}{L_r}. \quad (20)$$

Selecting a slip frequency close to the expected value of the rotor time constant increases accuracy of the rotor resistance estimation.

The observer model was developed in Matlab/Simulink. It includes the induction machine model, a dynamometer, and the induction machine parameter observers. The upper level system model is shown in FIG. 1, and the parameters observers subsystems are shown in FIG. 2.

In FIG. 1, the parameter identification model includes a voltage source 24. The AC machine model is shown at 26 and the parameter observers are developed by a system processor designated generally by action block 28. The outputs for the AC machine model can be viewed at 30.

In FIG. 2, the algorithm estimation is shown by the parameter observer diagram which calculates the estimated parameters $\hat{P}_1$ and $\hat{P}_2$. The angle of the synchronously rotating frame at 32 and the stator frame measured current at 34 are distributed to the transformation block 35. The axes are transformed from the xy axis to the dq axis and the resulting current value is transferred to block 36. The value for the angle at 32, as well as the values at 38 and 40, are known values in the memory of the microprocessor, the value at 40 being the stator voltage source.

The voltages are transformed from the xy axis to the dq axis at 42. The stator voltage and the stator current are multiplied at 44. The square of the stator current times the electrical speed occurs at 46. At 48, a product of the stator voltage and stator current is computed, J being the matrix.

The outputs from action blocks 36, 44, 46, and 48 are distributed to low pass filters, as shown at 50, 52, 54, and 56. The outputs of low pass filters 54 and 56 are operated on by the function $U_1 \div U_2$ at 58 to produce the characteristic parameter $\hat{P}2$. A similar calculation occurs at 60 to produce the characteristic parameter $\hat{P}_1$.

The parameters identification technique is tested on a low scale dynamometer. The induction machine parameters to be identified are given in the following table:

TABLE 1

|   | Rs (Ω) | Rr (Ω) | Ls (H) | Lr (H) | Lm (H) | np |
|---|--------|--------|--------|--------|--------|-----|
| P | .023   | .012   | .00064 | .00063 | .00058 | 2  |
| P̂ | .0228  | .0118  | .00063 | .00063 | .000575 |   |

In Table 1, the term "np" is the number of poles pairs. The resistance values are in ohms and the inductance values are in Henrys.

Figure 4A:
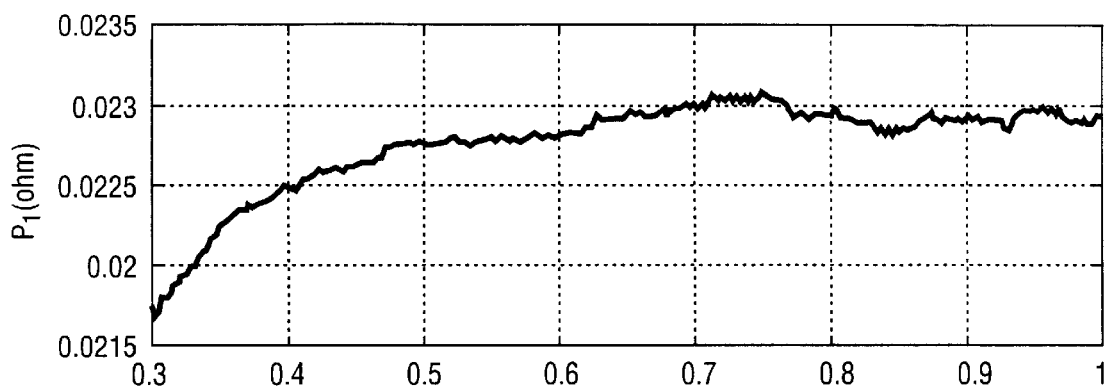
FIG. 4a and FIG. 4b are graphs that show the variation of parameters $P_1$ and $P_2$, respectively, for a no-load test.
Figure 4B:
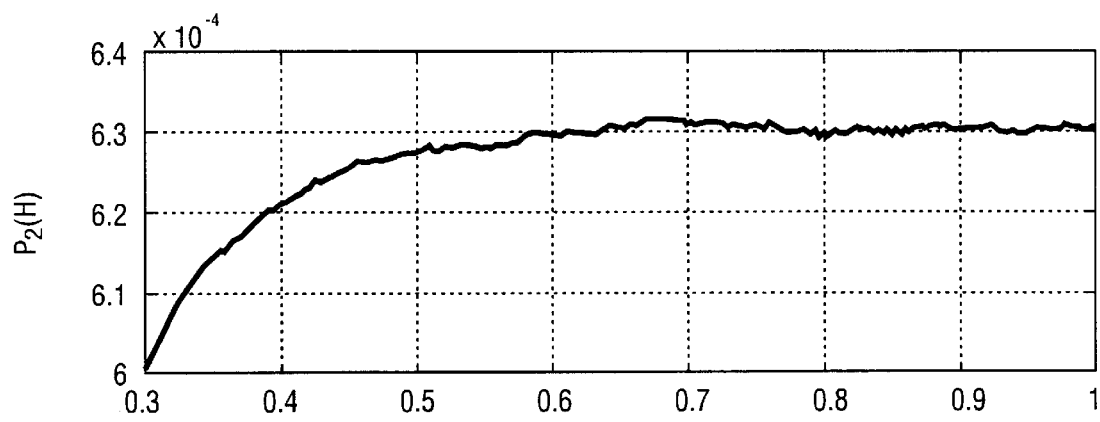

FIG. 3, FIGS. 4a and 4b show results of the simulation for no load conditions. The excitation voltage signal is selected to have an amplitude and frequency of:

$$V_{so}=5V \; \omega_e=100 \text{ rad/sec.} \quad (21)$$

FIG. 3 shows the stator current in the synchronously rotating frame that converges after an initial transient to a constant value. The current measurement is contaminated with a noise with the standard deviation $std(i_s) \approx 1A$. When the slip frequency is zero ($\omega_s=0$), the stator current vector defines the orientation of the rotor magnetic field, and the rotor flux is aligned with the stator current vector. The parameter estimation results are shown in FIG. 4, and the estimation of $R_s$ and $L_s$ coincide with the expected values from Table 1.

Figure 5A:
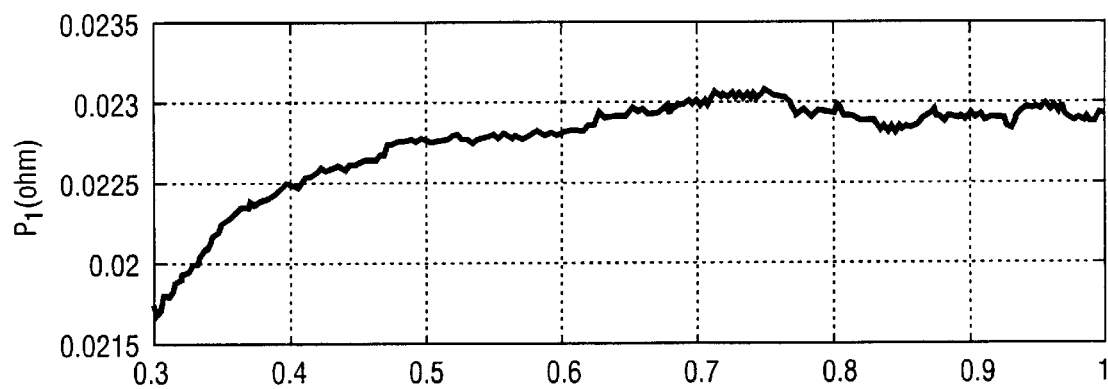
FIG. 5a and FIG. 5b show variations in parameters $P_1$ and $P_2$, respectively, for a locked rotor.
Figure 5B:
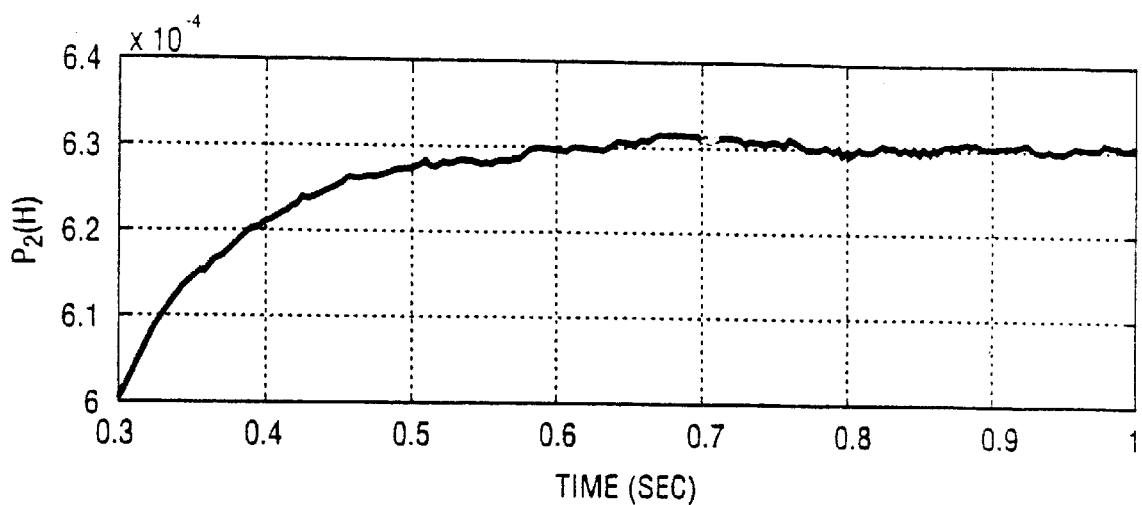

For a locked rotor test the rotor flux is not aligned with the stator current, and the flux amplitude is lower ($\lambda_r=0.015Wb$). The $P_1$, $P_2$ estimates in FIGS. 5a and 5b give the values for the nonlinear terms:

$$r_r \frac{\omega_e^2 L_M^2}{r_r^2 + \omega_e^2 L_r^2} \approx .0098, \quad (22)$$

$$L_s - L_r \frac{\omega_e^2 L_M^2}{r_r^2 + \omega_e^2 L_r^2} \approx 1.15e^{-4}. \quad (23)$$

Finding roots of the nonlinear functions (22), (23) defines the values for the rotor resistance and the leakage parameter that are close to the expected values from Table 1.

Figure 6:
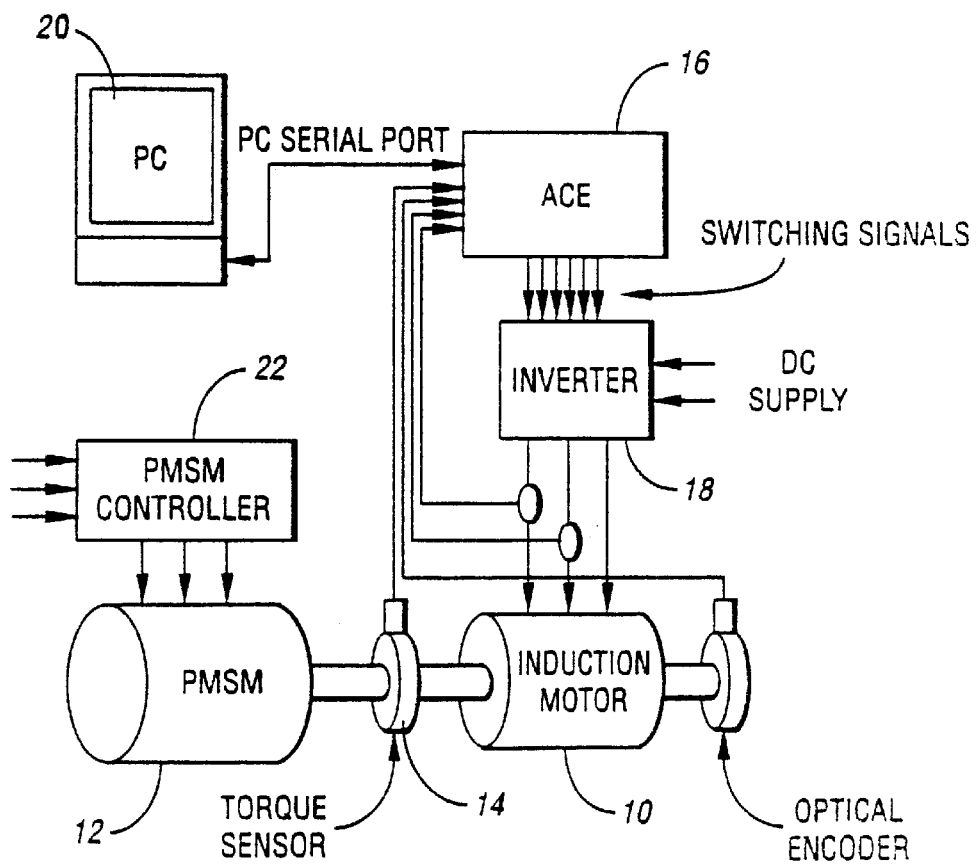
FIG. 6 shows an experimental test setup for real-time parameter identification algorithms.

The real-time parameter identification algorithms can be implemented on an experimental test setup shown in FIG. 6. This includes an induction machine 10 and a permanent magnet synchronous motor (PMSM) 12 coupled through a shaft with a torque sensor 14. The controller 16 performs signal conditioning and runs the IM inverter 18. The Xmath/SystemBuild graphical environment in the laptop PC 20 is used for the generation of controller C code and system development. The controller 22 controls the PMSM 12.

To make the controller code more efficient, all computation processes are divided into two classes: slow and fast. The slow processes are implemented in the outer loop with a sampling frequency of 1 kHz, and the fast ones run at 10 kHz in the inner loop. The fast processes include implementation of a field-oriented control, generation of the sinusoidal voltage signals for identification algorithms and updates of the current and speed signals. The induction machine parameter identification is performed in the outer loop with the frequency 1 kHz.

Figure 7:
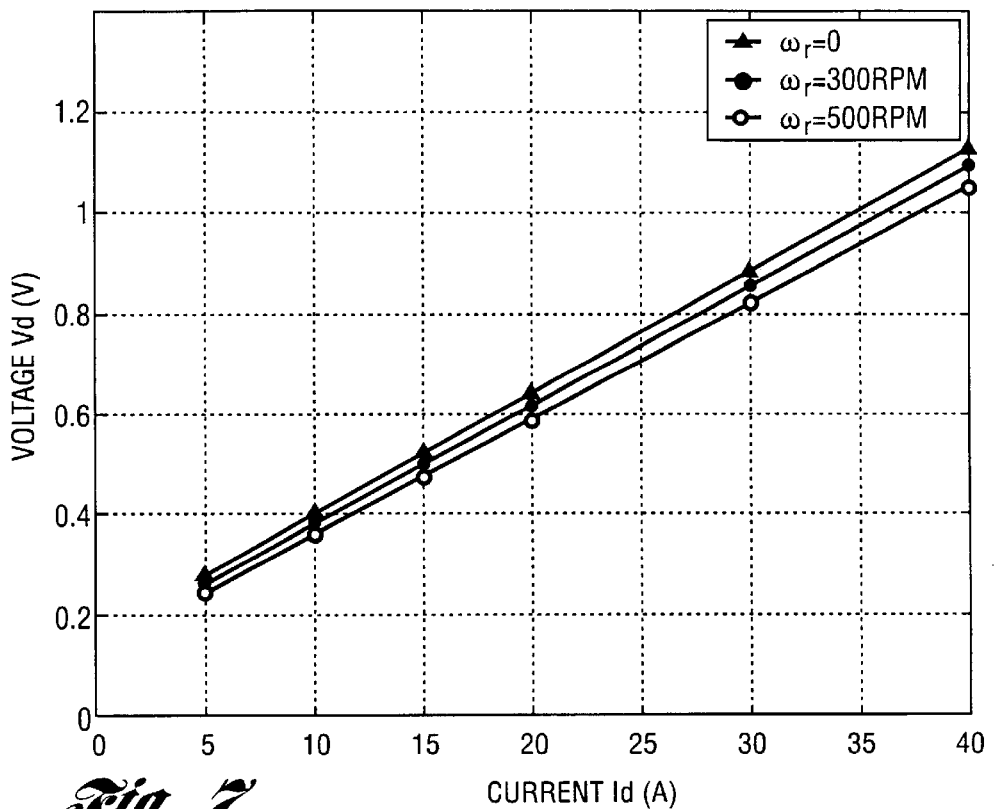
FIG. 7 is a plot of the d-axis voltage as a function of d-axis current.
Figure 8:
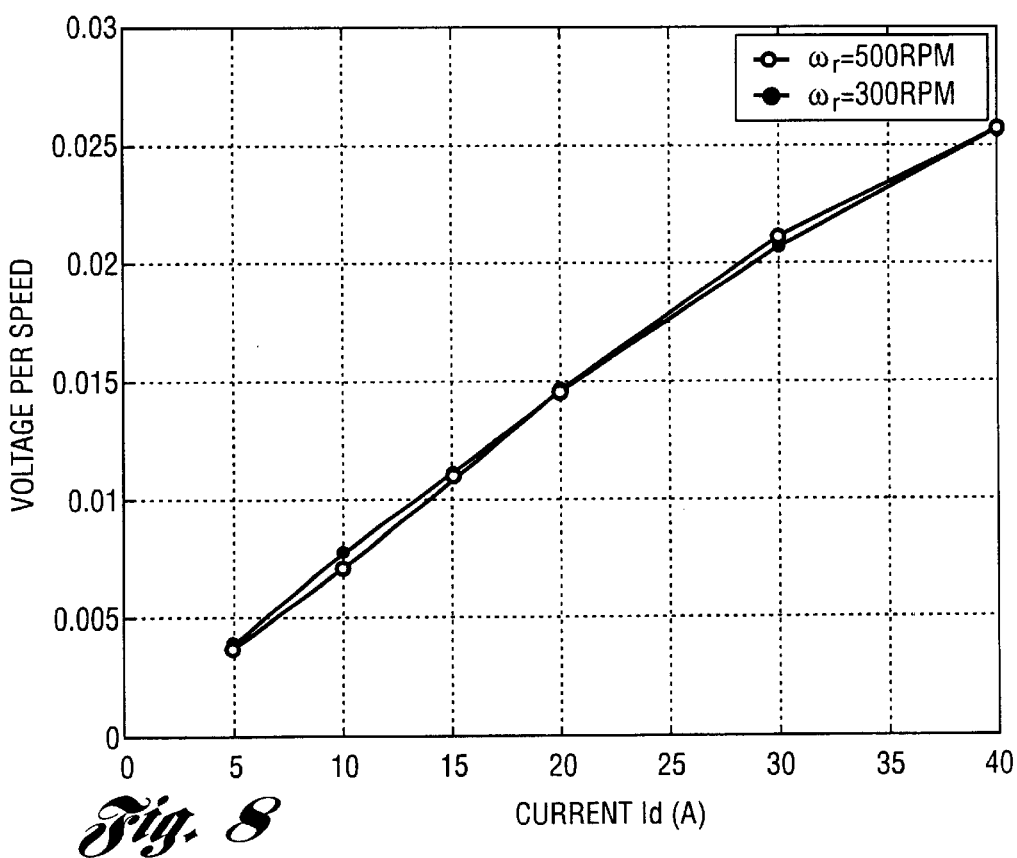
FIG. 8 is a plot of normalized q-axis voltage as a function of d-axis current.
Figure 9:
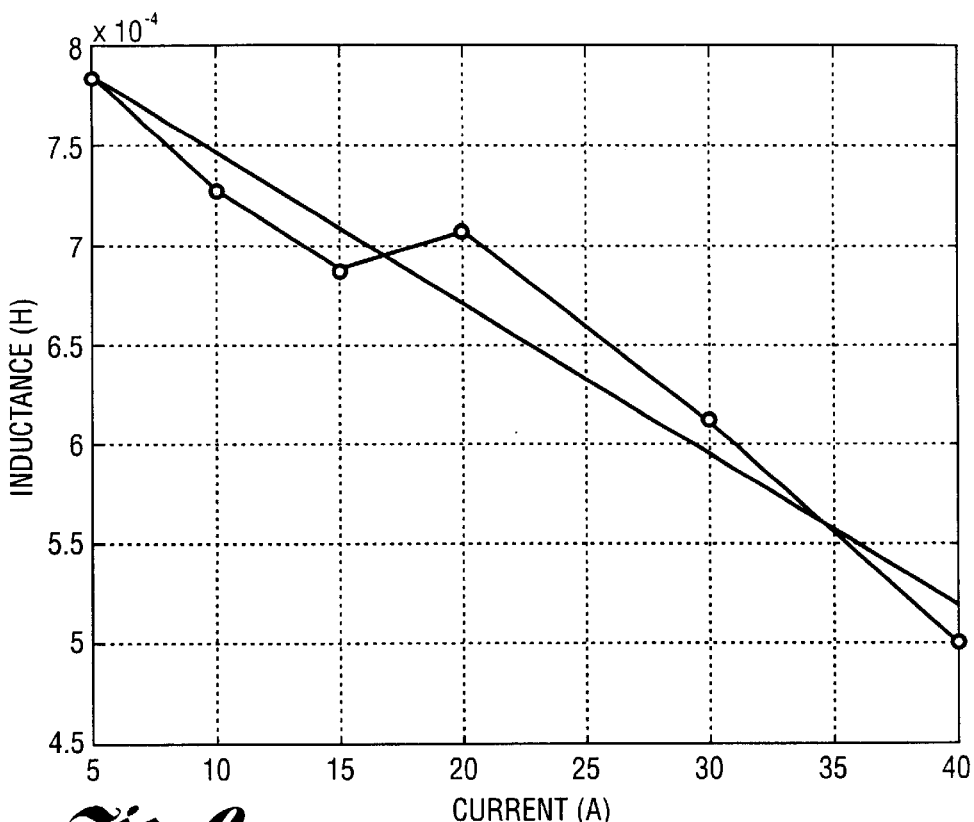
FIG. 9 is a plot showing the relationship between stator inductance and d-axis current during a zero-slip test.

The results of the no-load tests are summarized in FIGS. 7–9. FIG. 7 shows the voltage $V_d$ as a function of the $I_d$ current measured at different rotor speeds ($\omega_r=0,300,500$ rpm). For the least-mean-squares (LMS) approximation of the curves in FIG. 7, the Matlab function POLYFIT(X,Y,N) finds the coefficients of a polynomial P(X) of degree N that fits the data, P(X(I))~=Y(I), in a least-squares sense. The least-mean-square (LMS) approximation of the curves in FIG. 7 gives the following values for the stator resistance and the voltage offset:

$$R_s=0.023\Omega, \; V_0=0.146V, \quad (24)$$

with the result of $R_s$ identification being not dependent on the rotor speed.

FIG. 8 shows the $V_q$ component of the voltage normalized by the rotor electrical speed as a function of the $I_d$ current. The LMS approximation of the curves in FIG. 8 gives the average value of the stator inductance and the voltage offset; i.e., $$L_s=6.4 \cdot 10^{-4} H \; V_0=11.97 \cdot 10^{-4} \; V. \quad (25)$$

The slope of the curves in FIG. 8 decreases with increases of $I_d$. That indicates the dependence of the stator inductance $L_s$ on the stator current component $I_d$. By calculating the local slopes, the stator inductance as a function of $I_d$ is determined in FIG. 9 with the LMS procedure providing the following approximation of $L_s$:

$$L_s=-7.5 \cdot 10^{-6} I_d + 8.19 \cdot 10^{-4} \; H. \quad (26)$$

For locked rotor tests the values of the electrical excitation frequency and voltage amplitude are selected, respectively, at:

$$\omega_e=30,60,100 \text{ rad/sec}, \; V_e=0.5,0.8,1.0 \; V. \quad (27)$$

Figure 10:
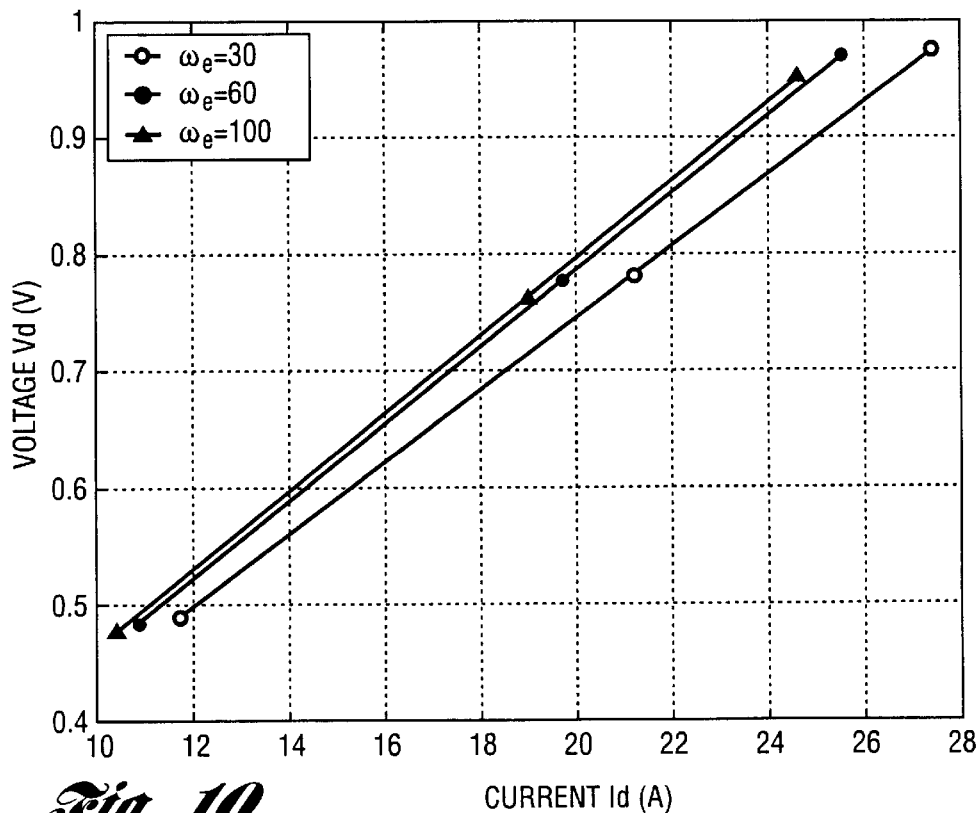
FIG. 10 is a plot of the relationship between d-axis voltage as a function of d-axis current during a rotor resistance identification locked rotor test.
Figure 11:
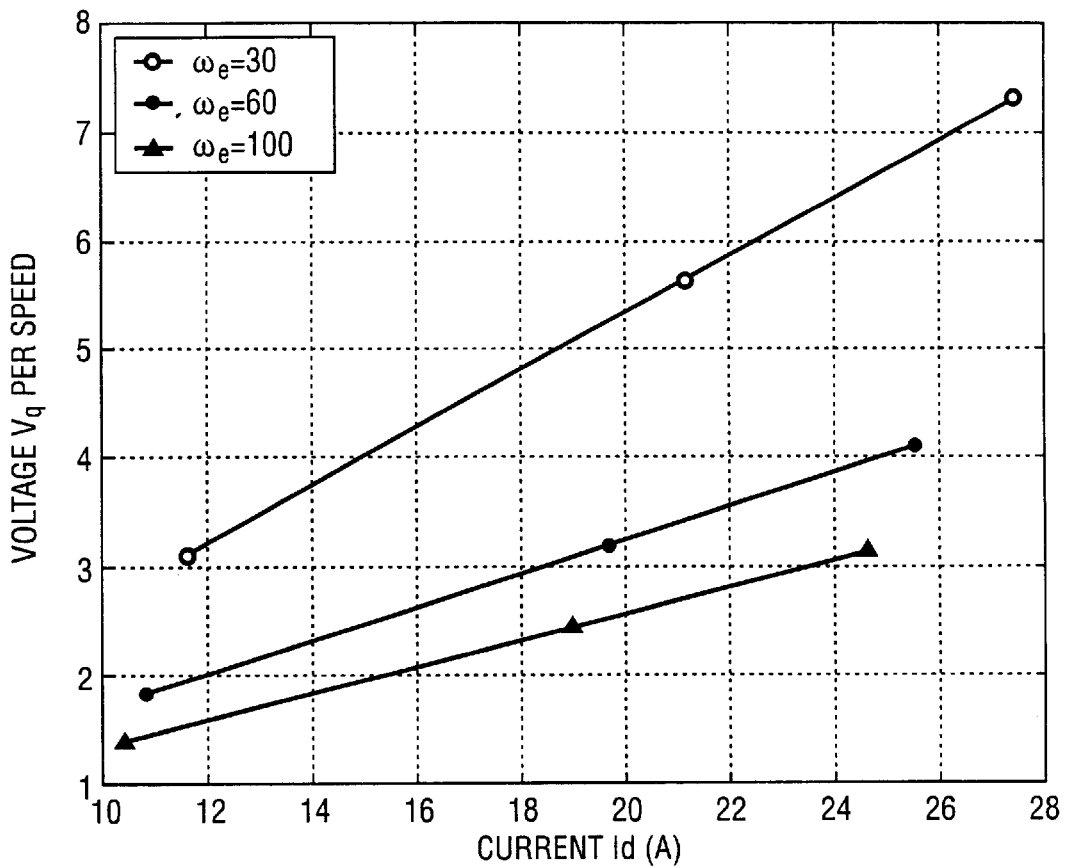
FIG. 11 is a plot showing the relationship between q-axis voltage divided by speed as a function of d-axis current for a mutual induction identification locked rotor test.

The results of the tests are summarized in FIGS. 10 and 11, where the $V_d$ voltage and the $V_q$ voltage, normalized by the speed, are shown as a function of the $I_d$ current. The LMS approximation gives the values of the parameters $P_1$ and $P_2$ in the following table:

TABLE 2

| $\omega_e$ (rad/sec) | $P_1$ (Ω) | $P_2$ (H) | $R_r$ (Ω) | $L_{1s}$ (H) |
|---|---|---|---|---|
| 30  | 0.0307 | 0.0002675 | 0.0132 | $4.78 \cdot 10^{-5}$ |
| 60  | 0.0327 | 0.0001525 | 0.0127 | $5.20 \cdot 10^{-5}$ |
| 100 | 0.0327 | 0.0001102 | 0.0119 | $5.21 \cdot 10^{-5}$ |

The parameters $P_1$ and $P_2$ are nonlinear functions of both rotor and stator leakages. At low excitation frequencies for accurate identification of $R_r$ and $L_{1s}$, $L_{1r}$ the Matlab constr function is used. The constr function finds the $R_r$ and $L_{1s}$, $L_{1r}$ by minimizing the quadratic function:

$$(P_1(R_r, L_{1s}, L_{1r})-P_1^*)^2 + (P_2(R_r, L_{1s}, L_{1r})-P_2^*)^2 \rightarrow \min \quad (28)$$

under constraints $$0 < R_r \leq R_{rmax}, \; 0 < L_{1s}, L_{1r} < L_{max}, \quad (29)$$

where $P_1^*$, $P_2^*$ are measured values of $P_1$, $P_2$. The results of $R_r$ and $L_{1s}$, $L_{1r}$ identification are given in Table 2. The results at different speeds are consistent, although the low frequency tests gives the higher value for the rotor resistance and the lower value for the leakage parameter.

The approximate formulas (18) and (19) at the excitation speed $\omega_e=100$ rad/sec give the values:

$$R_r \approx 0.0115(\Omega) \text{ and } L_{1s}, L_{1r}=5.5 \cdot 10^{-5} \; (H), \quad (30)$$

which are close to the values in Table 2 obtained by the constrained optimization.

The results of IM parameters identification can be verified by using the slip gain estimation procedure based on direct torque measurements. The slip gain η is the coefficient in the formula (31) for the calculation of the speed of the rotating electrical field $$\omega_e = \omega_r + \eta \frac{I_q^*}{I_d^*}. \tag{31}$$

For a description of a slip gain estimation procedure, reference may be made to co-pending application Ser. No. 10/073,476, filed by M. Degner and B. Wu on Feb. 11, 2002, entitled "Method And System For Controlling Torque In A Powertrain That Includes An Induction Motor." That application, the disclosure of which is incorporated herein by reference, is assigned to the assignee of the present invention.

Figure 12:
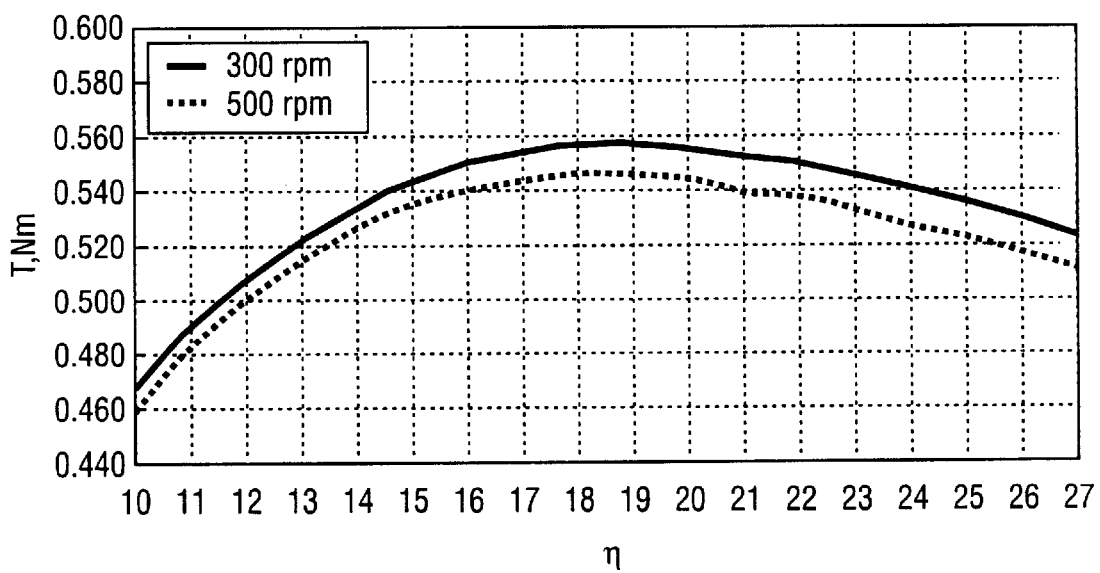
FIG. 12 is a plot of measured torque as a function of slip gain for two rotor speeds.

If the slip gain deviates from the actual value, the error in the orientation of the rotor flux reduces the produced electromagnetic torque. From this it follows that the produced torque curve has a maximum at the true value of the slip gain. A discrete time version of equation (31) is used in the control algorithm to determine the orientation of the rotor flux; and by changing η, the variation of the torque produced by the motor is determined. FIG. 12 represents the measured torque as a function of η for two rotor speeds and for torque command $T_{ref}$=0.5.

The maximum torque is achieved when the slip gain is between η=19 and η=20. This is close to the value obtained from the parameter estimation $$\eta = \frac{0.0127}{6.4 \cdot 10^{-4}} = 19.84$$

(see Table 2). The maximum values of the torque are above the reference value due to aerodynamic resistance and friction torque.

While the best mode for carrying out the invention has been described in detail, persons skilled in the art to which this invention relates will recognize various alternative designs and embodiments for practicing the invention, as defined by the following claims.

What is claimed:

1. A method for estimating in real-time operating parameters for a multi-phase induction machine with a stator and a rotor for use in a torque delivery driveline having a torque input member, a torque output member and a torque controller having a processor unit with a memory and parameter estimation algorithms stored in memory, the driveline responding to torque commands that are related functionally to operating variables including stator voltage, stator sinusoidal voltage frequency and stator current in a synchronously rotating frame relative to electrical excitation speed selected to be nominal and greater than zero, the processor unit operating on the variables in accordance with instructions imposed on it by the stored algorithms, the method including the steps of:

expressing stator voltage as a function of stator current, stator resistance, stator flux and stator excitation frequency;

establishing a functional relationship between rotor current, rotor flux, rotor resistance, electrical speed of applied stator voltage and rotor electrical speed;

transforming the functional relationship to eliminate derivatives and flux variables when the induction machine is in a steady state;

computing rotor current as a function of measured stator current;

computing stator voltage as a function of induction machine parameters, stator current, electrical speed and slip frequency;

projecting stator voltage on axes related to the stator current in a synchronously rotating frame;

transforming projected stator voltage orthogonal components and determining characteristic parameters using the orthogonal voltage components and stator current amplitude; and computing stator resistance and stator inductance as a function of the characteristic parameters when load on the torque output member is minimal.

2. The method set forth in claim 1 including the step of computing rotor resistance and rotor inductance as a function of the characteristic parameters when load on the torque output member is a maximum and slip frequency for the rotor and stator is high.

3. The method set forth in claim 2 including the step of computing stator leakage and rotor leakage as a function of the characteristic parameters and rotor resistance; and computing mutual inductance for the stator and the rotor as a function of stator inductance and stator leakage when the slip frequency is high.

4. The method set forth in claim 3 wherein a first of the characteristic parameters is expressed as:

$$P_1 = r_s + r_r \frac{\omega_e \omega_s L_M^2}{r_r^2 + \omega_s^2 L_r^2}$$

where $r_s$=stator resistance $r_r$=rotor resistance $\omega_e$=electrical speed $\omega_s$=slip frequency $L_M$=mutual inductance $L_r$=rotor inductance.

5. The method set forth in claim 4 wherein a second of the characteristic parameters is expressed as:

$$P_2 = \left(L_s - L_r \frac{\omega_s^2 L_M^2}{r_r^2 + \omega_s^2 L_r^2}\right)$$

where $L_s$=stator flux $L_r$=rotor flux $\omega_s$=slip frequency $L_M$=mutual inductance $L_r$=rotor inductance $r_r$=rotor resistance.

6. The method set forth in claim 4 wherein slip frequency is expressed as:

$$\omega_s = \omega_e - \omega_r$$

where $\omega_e$=electrical frequency of command voltage and $\omega_r$=measured rotor speed.

7. The method set forth in claim 5 wherein slip frequency is expressed as:

$$\omega_s = \omega_e - \omega_r$$

where $\omega_e$=electrical frequency of command voltage and $\omega_r$=measured rotor speed.

* * * * *